US010966116B2

(12) United States Patent
Yasukawa et al.

(10) Patent No.: US 10,966,116 B2
(45) Date of Patent: Mar. 30, 2021

(54) USER EQUIPMENT

(71) Applicant: NTT DOCOMO, INC., Tokyo (JP)

(72) Inventors: Shimpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 88 days.

(21) Appl. No.: 16/087,876

(22) PCT Filed: Mar. 24, 2017

(86) PCT No.: PCT/JP2017/012005
§ 371 (c)(1),
(2) Date: Sep. 24, 2018

(87) PCT Pub. No.: WO2017/170223
PCT Pub. Date: Oct. 5, 2017

(65) Prior Publication Data
US 2019/0110224 A1    Apr. 11, 2019

(30) Foreign Application Priority Data

Mar. 31, 2016   (JP) .............................. JP2016-073457

(51) Int. Cl.
*H04W 28/02*    (2009.01)
*H04W 72/04*    (2009.01)
(Continued)

(52) U.S. Cl.
CPC ... *H04W 28/0278* (2013.01); *H04W 72/0413* (2013.01); *H04W 72/0446* (2013.01);
(Continued)

(58) Field of Classification Search
None
See application file for complete search history.

(56) References Cited

U.S. PATENT DOCUMENTS 9,900,868 B2 *  2/2018  Lee ................... H04W 72/1284
2009/0113086 A1 *  4/2009  Wu ................... H04W 72/1284
                                                        710/56
(Continued)

FOREIGN PATENT DOCUMENTS

EP          1710963 A1    10/2006
JP       2011-525742 A     9/2011
(Continued)

OTHER PUBLICATIONS

Extended European Search Report issued in European Application No. 17774760.7, dated Oct. 7, 2019 (8 pages).
(Continued)

*Primary Examiner* — Lonnie V Sweet
(74) *Attorney, Agent, or Firm* — Osha Bergman Watanabe & Burton LLP

(57) ABSTRACT

To provide a technology of quickly transmitting a buffer status for a reduction of uplink transmission latency.
Provided is a user equipment including: a transmission and reception unit that transmits and receives radio signal to and from a base Station; and a buffer status report transmission unit that transmits, to the base station, a speculative buffer status report indicating a buffer status that is expected in a subsequent subframe.

16 Claims, 7 Drawing Sheets

(51) Int. Cl.
*H04W 72/12* (2009.01)
*H04W 72/14* (2009.01)
*H04W 24/02* (2009.01)

(52) U.S. Cl.
CPC ........... *H04W 72/12* (2013.01); *H04W 72/14* (2013.01); *H04W 24/02* (2013.01)

(56) References Cited

U.S. PATENT DOCUMENTS

| | | | |
|---|---|---|---|
| 2011/0085566 A1 | 4/2011 | Bucknell et al. | |
| 2011/0292901 A1 | 12/2011 | Pettersson et al. | |
| 2012/0039169 A1* | 2/2012 | Susitaival | H04W 28/12 370/230 |
| 2012/0044880 A1* | 2/2012 | Sun | H04W 72/1242 370/329 |
| 2013/0028223 A1* | 1/2013 | Kim | H04L 5/0053 370/329 |
| 2014/0269352 A1* | 9/2014 | Sun | H04W 72/1284 370/250 |
| 2016/0080969 A1* | 3/2016 | Tseng | H04W 4/70 370/329 |
| 2016/0081108 A1* | 3/2016 | Tseng | H04W 72/0493 370/329 |
| 2017/0019812 A1* | 1/2017 | Lee | H04W 28/0278 |
| 2017/0086168 A1* | 3/2017 | Takahashi | H04W 72/1284 |
| 2018/0049268 A1* | 2/2018 | Tenny | H04W 72/14 |

FOREIGN PATENT DOCUMENTS

| | | |
|---|---|---|
| JP | 2012-517732 A | 8/2012 |
| WO | 2009/103183 A1 | 8/2009 |
| WO | 2009156917 A1 | 12/2009 |

OTHER PUBLICATIONS

International Search Report issued in PCT/JP2017/012005 dated May 30, 2017 (5 pages).
Written Opinion of the International Searching Authority issued in PCT/JP2017/012005 dated May 30, 2017 (4 pages).
Nokia Networks, Nokia Corporation; "Impact of the TBS restriction of Cat-0 UE"; 3GPP TSG-RAN WG2 Meeting #87, Dresden, Germany; Aug. 18-22, 2014 (3 pages).
3GPP TS 36.213 V13.0.1; "3rd Generation Partnership Project; Technical Specification Group Radio Access Network; Evolved Universal Terrestrial Radio Access (E-UTRA); Physical layer procedures (Release 13)"; Jan. 2016 (326 pages).
3GPP TS 36.321 V13.0.0; "3rd Generation Partnership Project; Technical Specification Group Radio Access Network; Evolved Universal Terrestrial Radio Access (E-UTRA); Medium Access Control (MAC) protocol specification (Release 13)"; Dec. 2015 (82 pages).
Office Action in counterpart European Patent Application No. 17774760.7 dated Sep. 11, 2020 (7 pages).

* cited by examiner

|  | Reliability (%) | E2E latency (ms) | Data rate (Mbps) |
|---|---|---|---|
| Case 1 | [99.999] | [1-10] | [1-5] |
| Case 2 | [99.999] | [10-100] | [50-500] |

USER EQUIPMENT

TECHNICAL FIELD

The present invention relates to a radio communication system.

BACKGROUND ART

Currently, development of an ultra reliability and low latency communication (URLCC) is in progress to realize a radio communication with low latency and high reliability. As a case of using the URLCC, automatic traffic control and driving, a robot control network for cooperation of robots, a remote object operation such as remote operation, a remote control of a drone, remote health monitoring such as health sensor control and monitoring, public safety, and the like are assumed.

In the URLLC, typically. Case 1 with ultra-low latency and low data rate, and Case 2 with low latency and high data rate are considered. Specifically, Case 1 and Case 2 include requirements as illustrated in FIG. 1. For example, Case 1 may be required in use cases such as platooning in automatic driving, a remote machine control, tactile interaction (for example, remote operation, remote controlled robot and game) for a remote machine control and augmented reality (AP)/virtual reality (VR). On the other hand, for example. Case 2 may be required in use cases such as a video in which a latency request is in the order of 10 ms, cooperative dynamic map updating in automatic driving, and visual feedback (for example, remote operation, remote controlled robot and game) for a remote machine control and AR/VR. In addition, V2X may be the most challenging use case when considering much higher connection density and mobility.

In a long terra evolution (LTE) system and an LTE-advance system, as illustrated in FIG. 2, a user equipment (UE) and a base station (evolved NodeB: eNB) execute uplink transmission in a procedure as illustrated in FIG. 2. That is, when transmission target uplink data occurs in the user equipment, the user equipment transmits a scheduling request (SR) to the base station. The base station transmits an uplink grant in response to the scheduling request so as to permit transmission by the user equipment. When receiving the uplink grant, the user equipment transmits a buffer status report (BSR) indicating a data size of the transmission target uplink data, and then transmits uplink data in a physical uplink shared channel (PUSCH) that is allocated by the base station on the basis of the buffer status report.

CITATION LIST

Non-Patent Document

Non-Patent Document 1: 3GPP TS 36.213 V13.0.1
Non-Patent Document 2: 3GPP TS 36.321 V13.0.1

SUMMARY OF THE INVENTION

Problem to be Solved by the Invention

It is required to reduce latency due to the scheduling request and the buffer status report in the procedure so as to realize a radio communication with low latency and high reliability. Particularly, the buffer status report may become a cause for occurrence of latency because the buffer status report is transmitted after the scheduling request is transmitted and the uplink grant is received.

In consideration of the above-described problem, an object of the invention is to provide a technology of quickly transmitting a buffer status for a reduction of uplink transmission latency.

Means for Solving Problem

To solve the above-described problem, according to an aspect of the invention, there is provided a user equipment including: a transmission and reception unit that transmits and receives a radio signal to and from a base station; and a buffer status report transmission unit that transmits, to the base station, a speculative buffer status report indicating a buffer status Chat is expected in a subsequent subframe.

Effect of the Invention

According to the aspect of the invention, it is possible to provide a technology of quickly transmitting a buffer status for a reduction of uplink transmission latency.

MODE(S) FOR CARRYING OUT THE INVENTION

Hereinafter, an embodiment of the invention will be described with reference to the accompanying drawings.

In the following example, a user equipment that transmits a buffer status report is disclosed. In the example to be described later, a user equipment transmits a speculative buffer status report, which indicates traffic information (for example, may be a buffer status, a packet size, a packet period, or information for each logical channel) that is expected in a subsequent subframe and is transmitted from a terminal, to a base station. When reaching the subsequent subframe, the base station can allocate a resource to the user equipment on the basis of the buffer status that is indicated by the speculative buffer status report without receiving a scheduling request, or a buffer status report from the user equipment. According to this, it is possible to avoid latency due to transmission of the scheduling request and the buffer status report.

Figure 3:
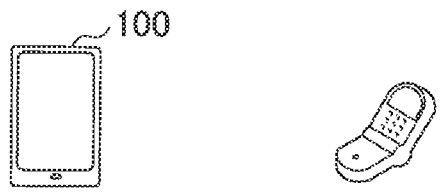
FIG. 3 is a schematic view illustrating a radio communication system according to an example of the invention.

First, description will be given of a radio communication system according to the example of the invention with reference to FIG. 3. FIG. 3 is a schematic view illustrating the radio communication system according to the example of the invention.

As illustrated in FIG. 3, a radio communication system 10 includes a user equipment 100 and a base station 200. For example, the radio communication system 10 is a radio communication system conforming to a standard according to a $3^{rd}$ generation partnership project (3GPP) such as an LTE system, art LTE-advanced system, and a 5G system. In the example in the drawing, only one base station 200 is illustrated, but a plurality of the base stations 200 are disposed to cover a service area of the radio communication system 10.

The user equipment (UE) 100 transmits and receives a radio signal to and from the base station 200 through a cell that is provided by the base station 200. Typically, as illustrated in the drawing, the user equipment 100 may be any appropriate information processing apparatus such as a smartphone, a portable telephone, a tablet, a mobile router, and a wearable terminal which are provided with a radio communication function. In addition, the user equipment 100 may be provided with a device-to-device (D2D) function capable of performing a communication with another user equipment 100 without through the base station 200.

Figure 4:
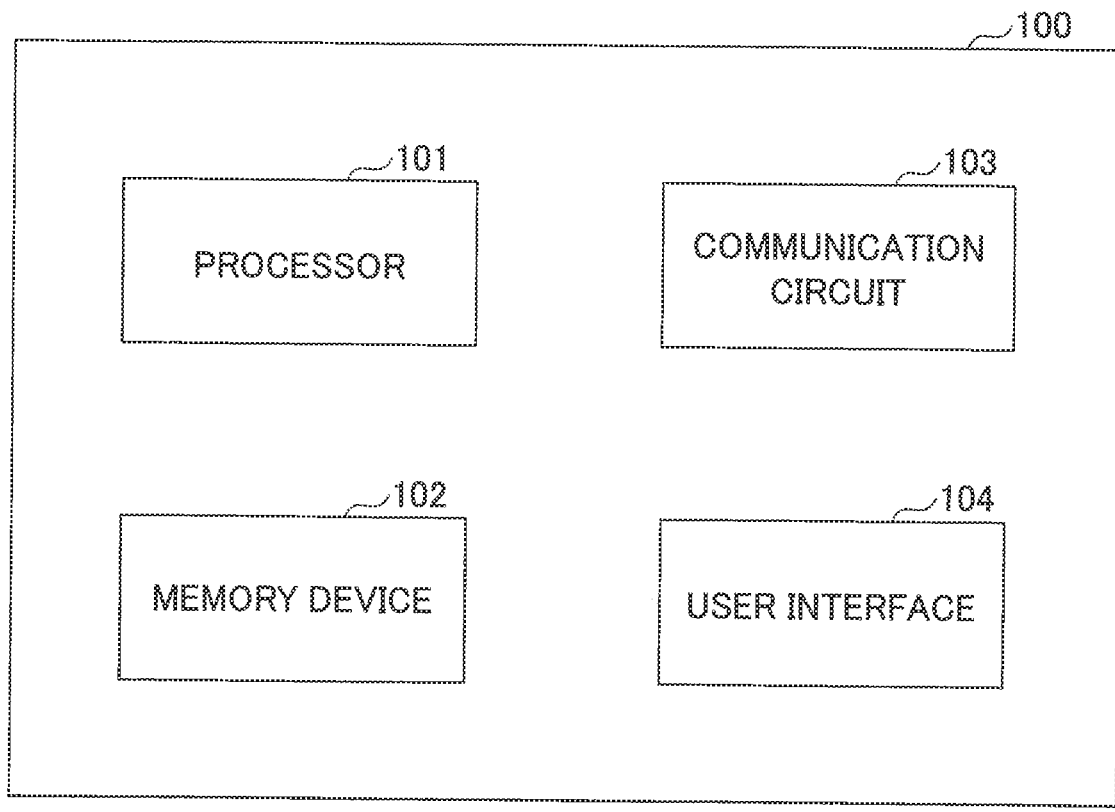
FIG. 4 is a block diagram illustrating a hardware configuration of a user equipment according to the example of the invention.

As illustrated in FIG. 4, the user equipment 100 is constituted by hardware resources such as a processor 101 that functions as a central processing unit (CPU), a memory device 102 such as a random access memory (RAM) and/or a flash memory, a communication circuit 103 that transmits and receives a radio signal to and from the base station 200, an user interface 104 such as an input and output device and/or a peripheral device, and the like. For example, each function and each kind of processing of the user equipment 100 to be described later may be realized through processing or execution of data and/or a program, which are/is stored in the memory device 102, by the processor 101. However, the user equipment 100 is not limited to the above-described hardware configuration, and may be constituted by a circuit that realizes one or more kinds of processing to be described later, and the like.

The base station (eMB) 200 is wirelessly connected to the user equipment 100 to transmit a downlink (DL) packet received from a higher station and/or a server that is communicatively connected to a core network (not illustrated) to the user equipment 100, and transmits an uplink (UL) packet received from the user equipment 100 to a server.

Figure 5:
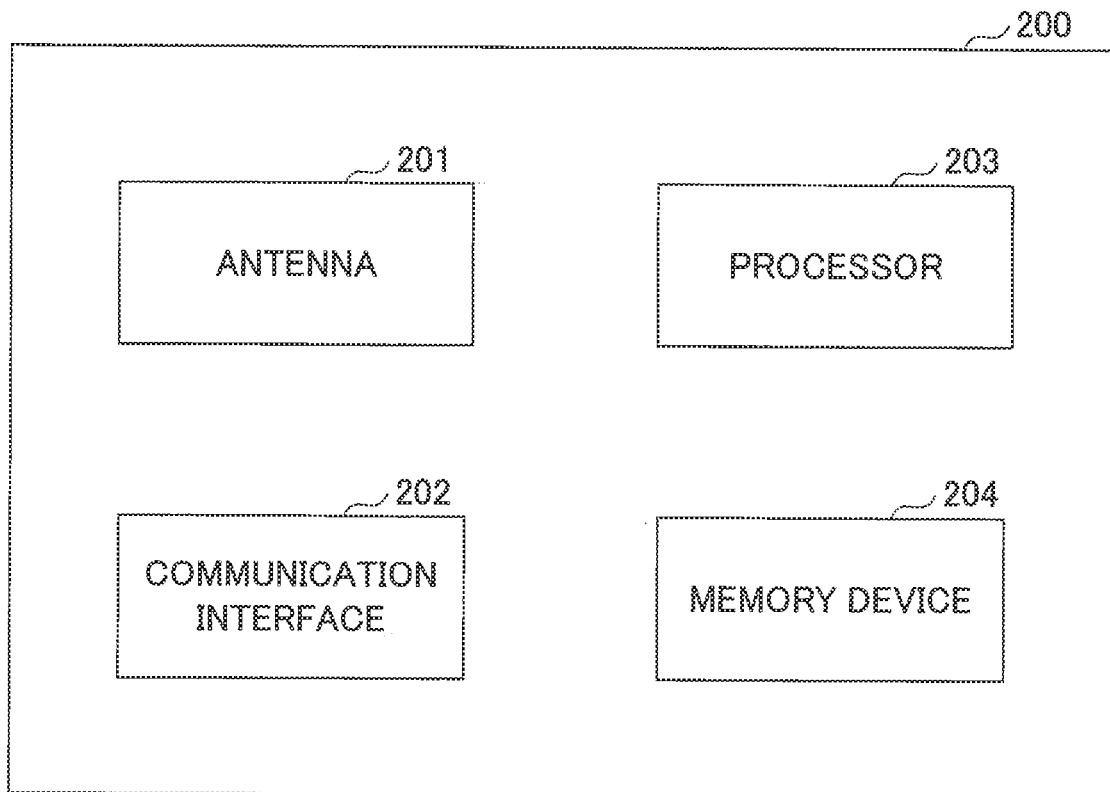
FIG. 5 is a block diagram illustrating a hardware configuration of a base station according to the example of the invention.

As illustrated in FIG. 5, typically, the base station 200 is constituted by hardware resources such as an antenna 201 that transmits and receive a radio signal to and from the user equipment 100, a communication interface 202 including an X2 interface for a communication with an adjacent base station 200 and an S1 interface for a communication with the core network (not illustrated), a processor 203 that processes a signal that is transmitted to and received from the user equipment 100, and a memory device 204. Each function and each kind of processing of the base station 200 to be described later may be realized through processing or execution of data or a program, which is stored in the memory device 204, by the processor 203. However, the base station 200 is not limited to the above-described hardware configuration and may have any appropriate hardware configuration.

Figure 6:
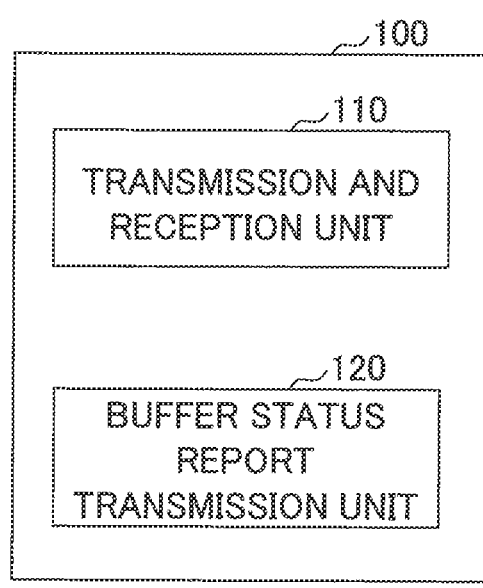
FIG. 6 is a block diagram illustrating a functional configuration of the user equipment according to the example of the invention.

Next, description will be given of the user equipment according to the example of the invention with reference to FIG. 6. FIG. 6 is a block diagram illustrating a functional configuration of the user equipment, according to the example of the invention.

As illustrated in FIG. 6, the user equipment 100 includes a transmission and reception unit 110 and a buffer status report transmission unit 120.

Figures 1, 2:
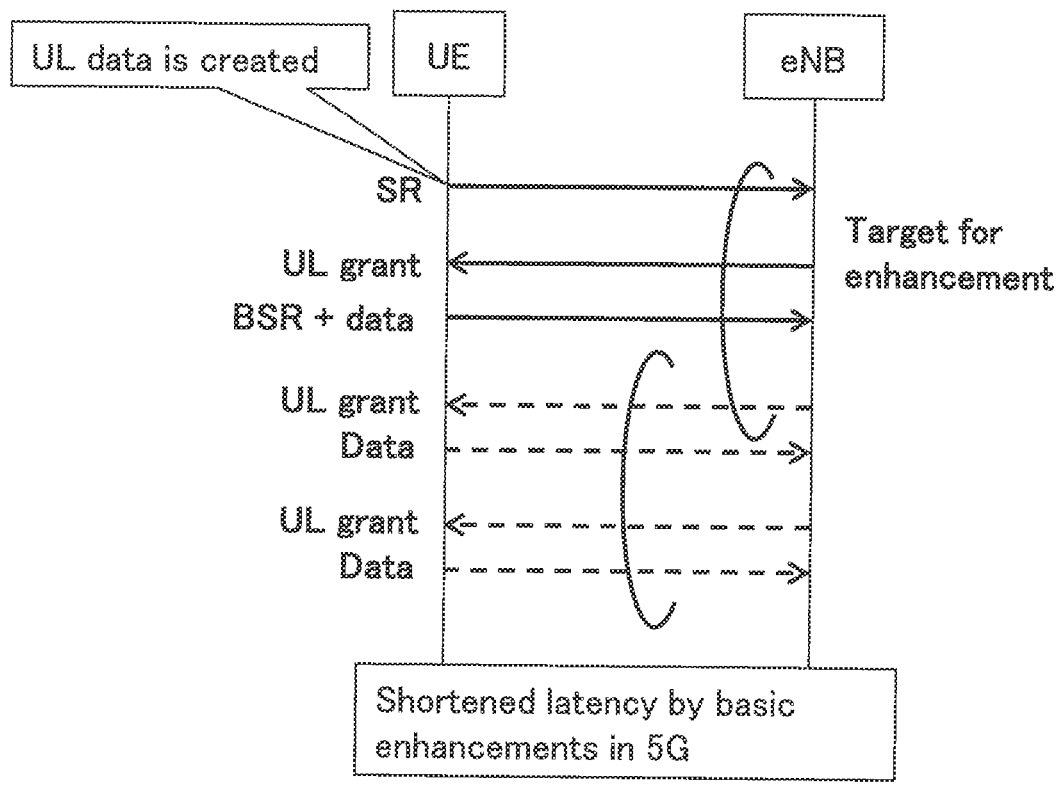
FIG. 1 is a schematic view illustrating required conditions in a URLLC.
FIG. 2 is a sequence diagram illustrating an uplink transmission procedure.

The transmission and reception unit 110 transmits and receives a radio signal to and from the base station 200. Specifically, the transmission and reception unit 110 transmits and receives various radio channels such as an uplink/downlink control channel and/or an uplink/downlink data channel to and from the base station 200. As described above with reference to FIG. 2, when transmission target data occurs in the user equipment 100, the transmission and reception unit 110 transmits a scheduling request to the base station 200 so as to make a request for the base station 200 to allocate a PUSCH for transmission of the data. When receiving an uplink grant with respect to the scheduling request from the base station 200, the transmission and reception unit 110 transmits a normal buffer status report indicating a current buffer status, or a speculative buffer status report indicating a future buffer status as to be described later to the base station 200, and transmit uplink data in a PUSCH that is set by the base station 200 on the basis of the buffer status.

Figure 7:
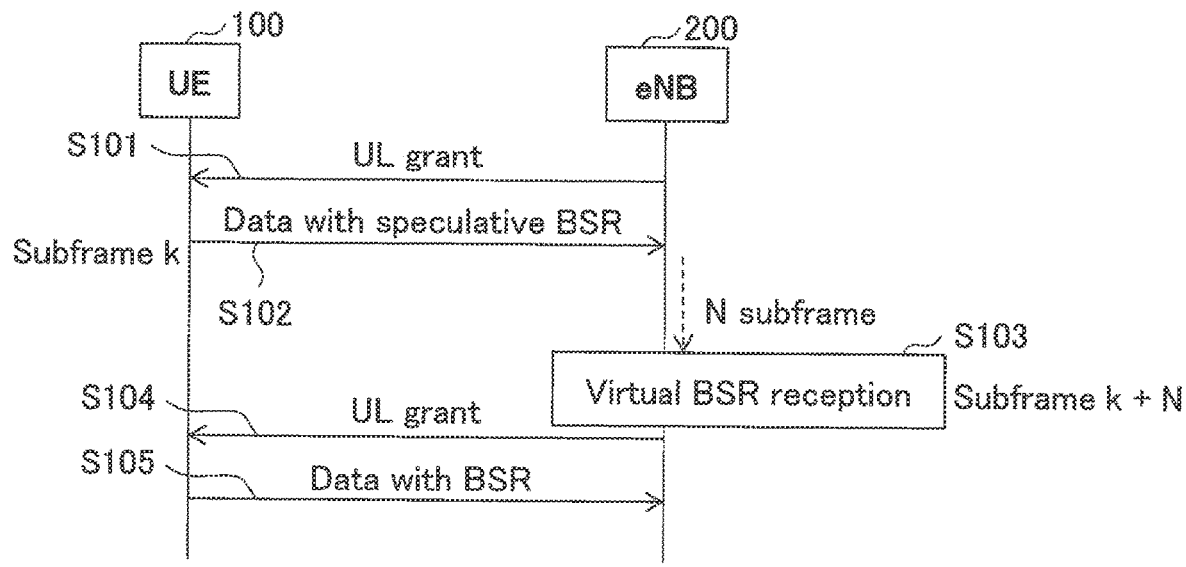
FIG. 7 is a sequence diagram illustrating uplink transmission by using a speculative buffer status report according to the example of the invention.

The buffer statue report transmission unit 120 transmits, to the base station 200, the speculative buffer status report that indicates a buffer status that is expected in a subsequent subframe. Specifically, as illustrated in FIG. 7, when receiving an uplink grant from the base station 200 in step S101. In step S102, with regard to a current subframe k, the buffer status report transmission unit 120 expects a size of transmission target data, which remains in a buffer in a subframe k+N after N subframes from the subframe k, and transmits, to the base station 200, the data size, which is expected, as the speculative buffer status report. For example, the expectation may be conducted on the basis of the kind of the transmission target data, the type of a bearer, and the like. Furthermore, N may be a predetermined value, or N may be transmitted (indicated) in the speculative buffer status report. In other words, the subsequent subframe k+N, which is indicated in the speculative buffer status report, may be a subframe after a predetermined number of subframes N from the current subframe k in which the speculative buffer status report is transmitted, or a subframe after a number of subframes N, which is indicated in the speculative buffer status report, from the current subframe k. With regard to the latter, for example, N may be assumed as aM. Here, "a" may represent an indicator that is shown in the speculative buffer status report, and K may be set by a network, or may be set as a time unit that is defined in usage.

When reaching the subframe k+N, in step S103, the base station 200 virtually regards that a buffer status report is received in the subframe k+N in accordance with the speculative buffer status report that is received in the subframe k. In step S104, the base station 200 transmits an uplink grant to the user equipment 100 on the basis of a data size that is shown in the speculative buffer status report. That is, the base station 200 may virtually regard that the speculative buffer status report received in the subframe k as a normal buffer status report in the subframe k+N after N subframes, and may allocate uplink data to the user equipment 100 on the basis of the speculative buffer status report without receiving the scheduling request and/or the buffer status report. Then, in step S105, the transmission and reception unit 110 transmits uplink data in combination with a normal buffer status report indicating a buffer status in the point of time.

Figure 8:
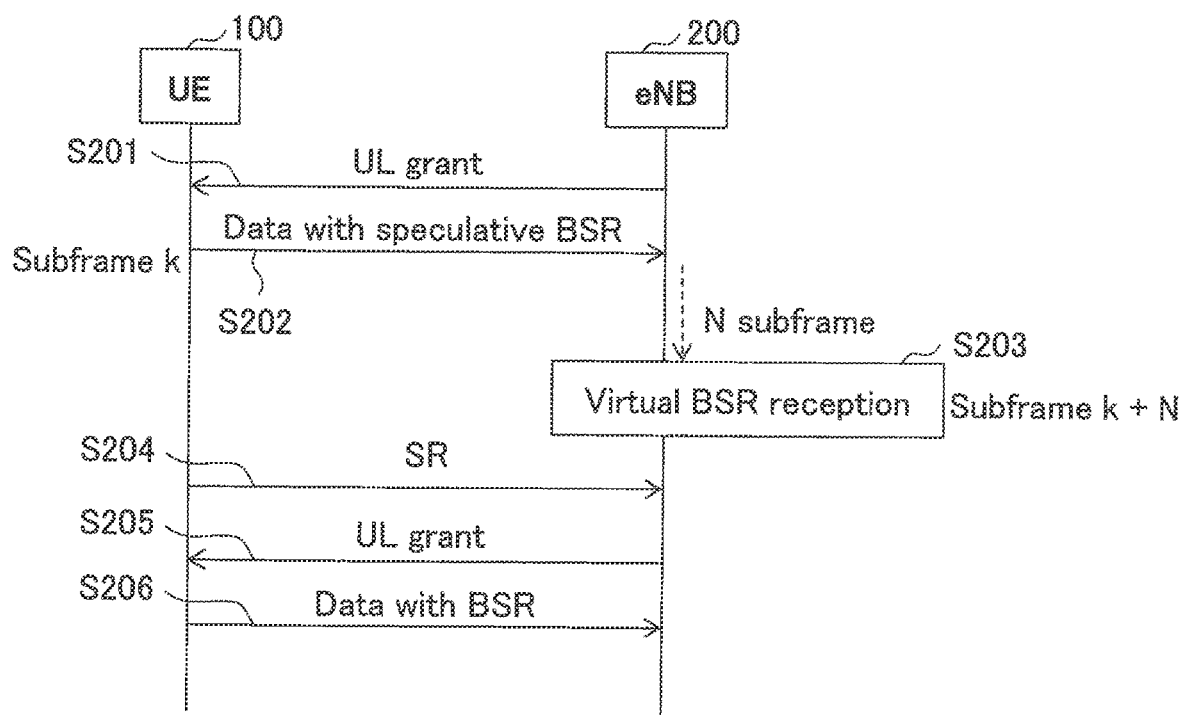
FIG. 8 is a sequence diagram illustrating uplink transmission by using a speculative buffer status report according to another example of the invention.

Alternatively, as illustrated in FIG. 8, after receiving the scheduling request from the user equipment 100 in step S204, the base station 200 may transmit an uplink grant to the user equipment 100 on the basis of a data size that is shown in the speculative buffer status report.

In the example, the buffer status report transmission unit 120 may transmits, to the base station 200, a new speculative buffer status report, which indicates a re-expected buffer status with respect to the subsequent subframe, so as to update the speculative buffer status report with respect to the subsequent subframe. That is, the data size, which is shown in the speculative buffer status report, is an expected value, and thus the expected value may change thereafter. Accordingly, the buffer status report transmission unit 120 transmits, to the base station 200, the re-expected data size as a new speculative buffer status report, and the base station 200 may update or rewrite the speculative buffer status report, which is previously received, with the new speculative buffer status report. According to this, the base station 200 can allocate a resource on the basis of the last expected value.

Figure 9:
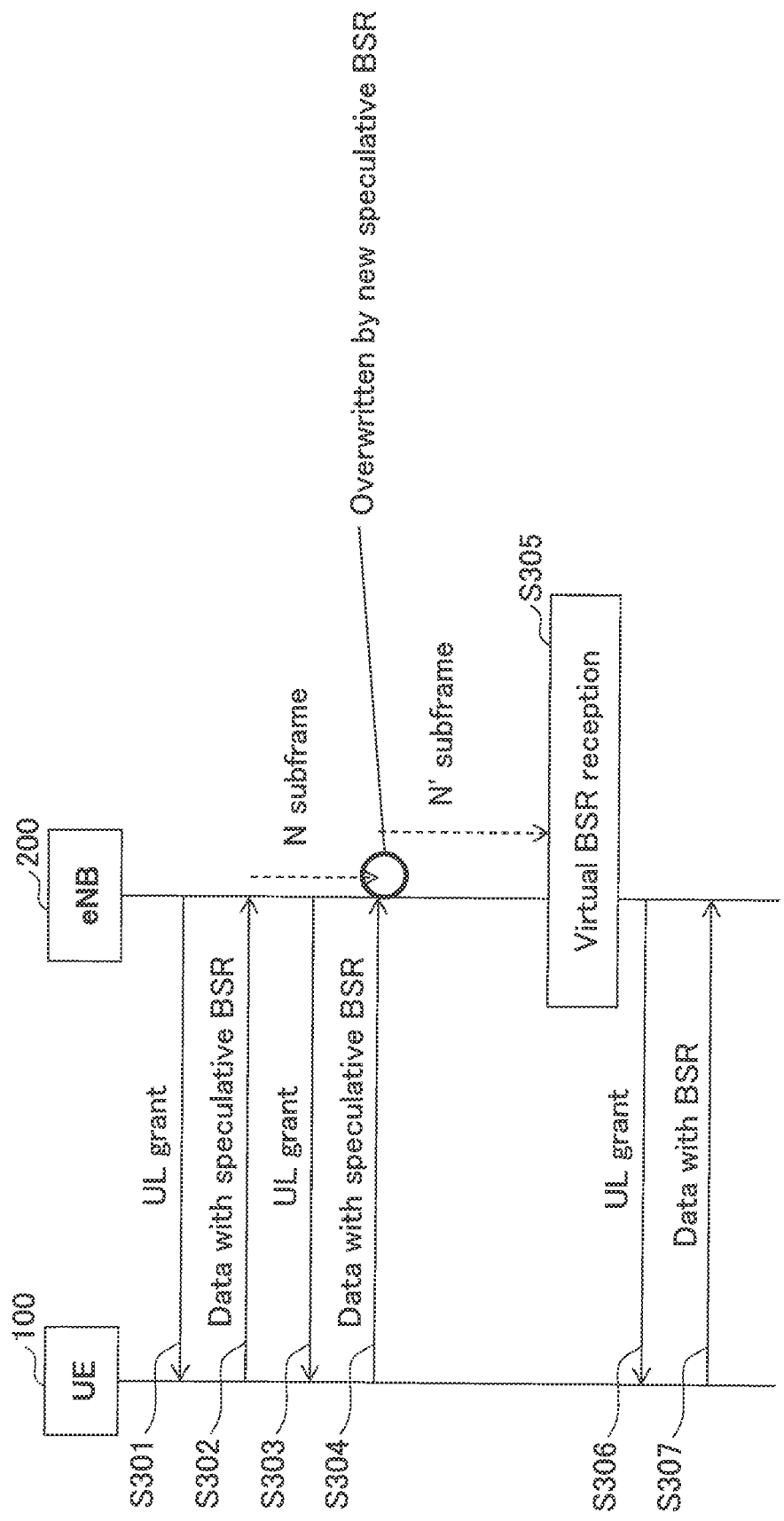
FIG. 9 is a sequence diagram illustrating uplink transmission by using the speculative buffer status report according to the other example of the invention.

Specifically, as illustrated in FIG. 9, when the base station 200 transmits an uplink grant to the user equipment 100 in step S301, the buffer status report transmission unit 120 transmits uplink data to the base station 200 in combination with a speculative buffer status report with respect to the subsequent subframe in step S302. In step S303, the base station 200 transmits the uplink grant to the user equipment 100 in step S303, and then the buffer status report transmission unit 120 determines that the speculative buffer status report, which is transmitted in step S302, is to be changed. In step S304, the buffer status report transmission unit 120 transmits a new speculative buffer status report to the base station 200, and the base station 200 updates the speculative buffer status report, which is previously received, with the new speculative buffer status report. Then, when reaching the subframe of the speculative buffer status report, in step S305, the base station 200 virtually regards that the buffer status report is received in accordance with the new speculative buffer status report, and transmits the uplink grant to the user equipment 100 on the basis of data size that is shown in the speculative buffer status report in step S306. Then, in step S307, the transmission and reception unit 110 transmits uplink data in combination with a normal buffer status report Indicating a buffer status at the point of time.

For example, in a case where the speculative buffer status report is managed by one process, the base station 200 may update or rewrite the speculative buffer status report, which exists, with the new speculative buffer status report that is received. In addition, a scheduling request, which makes a request for canceling of the speculative buffer status report that is previously transmitted, may be transmitted to the base station 200. Alternatively, in a case where the speculative buffer status report is managed by a plurality of processes, the buffer status report transmission unit 120 applies a process ID, which is the same as a process ID applied to the previous speculative buffer status report, to the new speculative buffer status report, and the base station 200 can identify a speculative buffer status report, which is an update target, based on the process ID that is received. Alternatively, overhead of the process ID transmission may be reduced by uniquely determining the process ID in accordance with a transmission subframe of the speculative buffer status report.

In the example, the buffer status report transmission unit 120 may transmit, to the base station 200, the speculative buffer status report in response to downlink control signaling. For example, the buffer status report transmission unit 120 may transmit, to the base station 200, the speculative buffer status report in response to reception of an uplink grant or a timing advance (TA) command. Alternatively, in a case where the uplink grant is received, and the entirety of pieces of data which remain can be transmitted by a resource allocated by the uplink grant, the buffer status report transmission unit 120 may transmit, to the base station 200, the speculative buffer status report. In this case, remaining data is not present, and thus it is not necessary to transmit a normal buffer status report. Accordingly, the buffer status report transmission unit 120 can transmit the speculative buffer status report to the base station 200 without additional overhead by using a resource for the normal buffer status report.

In the example, the buffer status report transmission unit 120 may exclusively transmit the normal buffer status report indicating a current buffer status and the speculative buffer status report. The term of "exclusively" used herein represents that only any one of the speculative buffer status report and the normal buffer status report is transmitted in any resource. According to this, the speculative buffer status report can be transmitted by the same medium access control (MAC) control element as in the normal buffer status report, and can be introduced without adding overhead and/or without affecting current specifications. In addition, the speculative buffer status report may be used to implicitly or explicitly indicate absence of remaining data in the subframe. For example, the speculative buffer status report may be triggered only in a case where a buffer size in the subframe is zero.

In the example, permission or prohibition of transmission of the speculative buffer status report may be set for each user equipment or each logical channel. A greedy user equipment 100, which indicates (transmits) an excessive data size in the speculative buffer status report, may exist. To avoid this situation, the base station 200 may control permission or prohibition of transmission of the speculative buffer status report for each user equipment or each logical channel. Alternatively, the transmission frequency and/or the maximum buffer size of the speculative buffer status report may be set by the base station 200.

Figure 10:
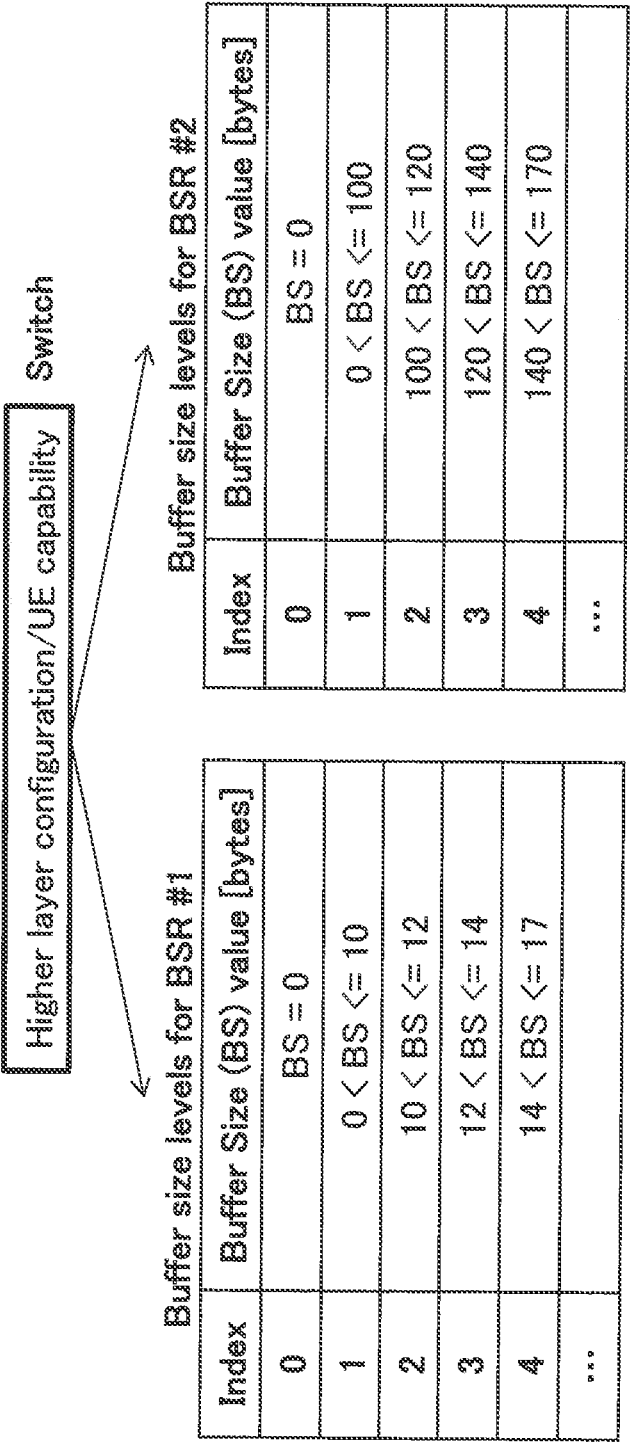
FIG. 10 is a schematic view illustrating a plurality of buffer status report tables according to the example of the invention.

In addition, in the example, the buffer status report transmission unit 120 may include a plurality of buffer status report tables corresponding to buffer size levels different from each other. As described above, in a case where ultra-low latency is required in the URLLC, It is considered that a data size is small, and a buffer status report having a small buffer size can be used. In addition, in a case where a high data rate is required in the URLLC, a buffer status report having a great buffer size is necessary. Accordingly, it is demanded to cover a wide buffer size range. Accordingly, as illustrated in FIG. 10, a plurality of buffer status report tables, which correspond to buffer size levels different from each other, are prepared, and the buffer status report tables may be used in a switching manner.

For example, each of the buffer status report tables may be selected for each user equipment or each logical channel. Alternatively, a buffer status report table, which is designated by higher layer signaling from the base station 200, may be used. Alternatively, the buffer status report transmission unit 120 may select one of the plurality of buffer status report tables, and may indicate (transmit) the table by using one or more bits in the buffer status report. Alternatively, the buffer status report table may be correlated with the user equipment 100 in accordance with a category or capability of the user equipment 100.

In addition, table sizes (index ranges) may be different from each other between buffer status report tables. For example, in a case where a buffer size range is small, a corresponding buffer status report table may be a small table. The small buffer status report table is suitable for a user equipment 100 such as a low cost UE having limited capability. In addition, the buffer status report transmission unit 120 may transmit a request for changing of the buffer status report table to the base station 200.

In addition, in a case where the user equipment 100 can transmit a scheduling request in combination with a simplified buffer status report indicating whether or not transmission target data has a size equal to or greater than a predetermined size, the buffer status report transmission unit 120 may indicate (transmit) a plurality of buffer sizes capable of being transmitted in a subframe. In this case, it is considered that a buffer status report, which is appropriate for a relatively large buffer size, provides efficient processing.

In addition, the buffer status report transmission unit 120 may use a limited buffer size by using the speculative buffer status report, and may indicate (transmit) a larger buffer size by using the normal buffer status report.

The example may be applied to a buffer status report for an inter-terminal communication without limitation to the buffer status report for uplink resource allocation. The same resource allocation low latency effect is also expected in the inter-terminal communication.

Hereinbefore, the examples of the invention have been described in detail. However, the invention is not limited to a specific embodiment, and various modifications and changes can be made in a range of the gist of the invention in claims.

Here, the block diagrams for use in the above description of embodiments show blocks for functional units. These functional blocks (components) are implemented in any combination of hardware and/or software items. Also, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 11:
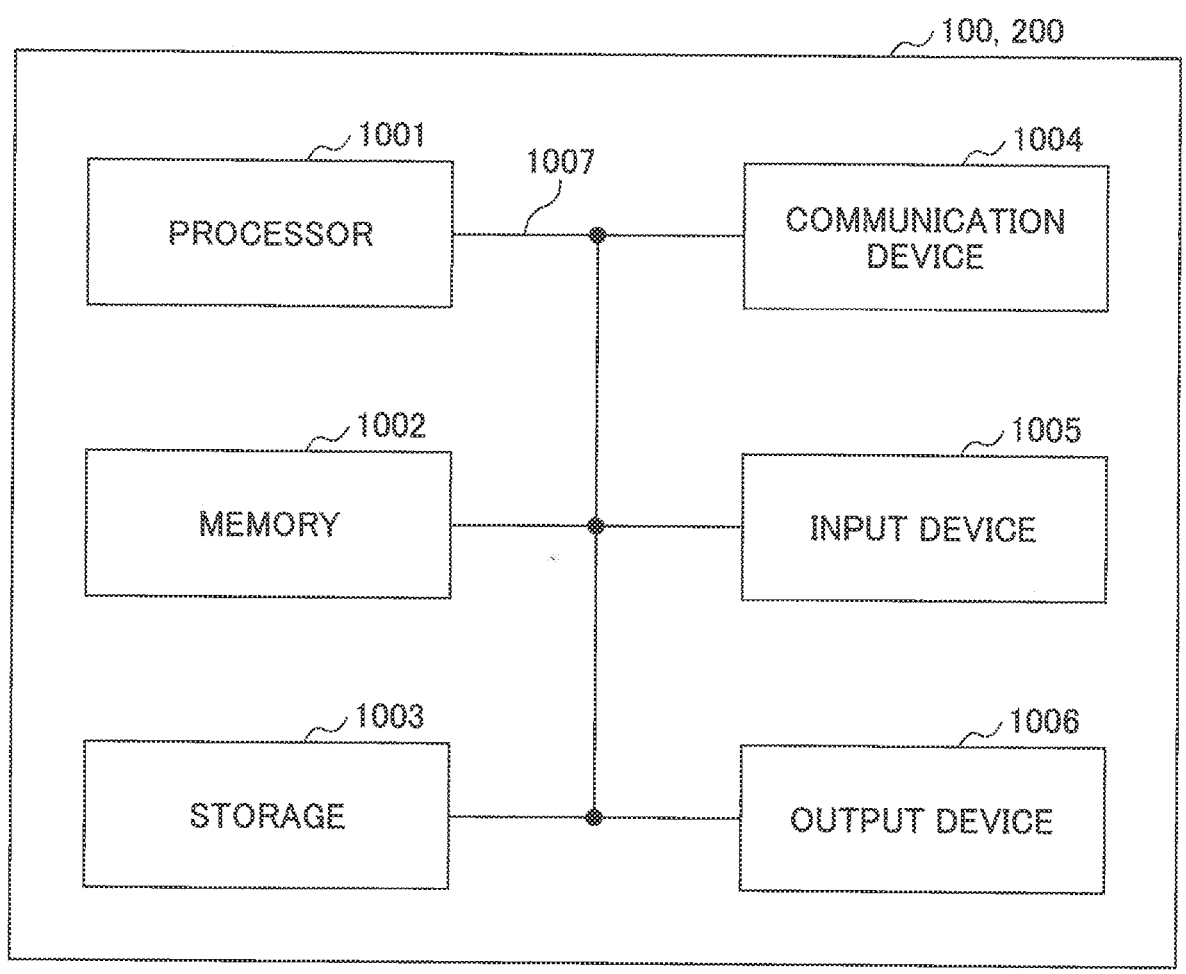
FIG. 11 is a block diagram illustrating hardware configurations of a user equipment and a base station according to the example of the invention.

For example, the user equipment 100 and the base station 200 according to one embodiment of the present invention may function as a computer processing the radio communication method according to the present invention. FIG. 11 is a block diagram for illustrating a hardware arrangement of the user equipment 100 and the base station 200 according to one embodiment of the present invention. The user equipment 100 and the base station 200 as stated above may each be physically arranged as a computer device including a processor 1001, a memory 1002, a storage 1003, a communication device 1004, an input device 1005, an output device 1006, a bus 1007 or the like.

Note that the language "apparatus" can be interchangeably road as a circuit, a device, a unit or the like. The hardware arrangement of the user equipment 100 and the base station 200 may each be arranged to include one or more of the illustrated devices or without including a part of the devices.

Respective functions in the user equipment 100 and the base station 200 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1002 may be arranged with a central processing unit (CPU) including an interface with a peripheral device, a control device, a calculation device, a register and the like. For example, the above-stated components may be implemented in the processor 1001.

Also, the processor 1001 loads programs (program codes, software modules and data from the storage 1003 and/or the communication device 1004 into the memory 1002 and executes various operations in accordance with then. As the programs, programs for causing the computer to perform at least; a part of operations as described in the above embodiments are used. For example, operations by the components in the user equipment 100 and the babe station 200 may be implemented with control programs stored in the memory 1002 and executed by the processor 1001, and other functional blocks may be similarly implemented. It has been described that the above-stated various operations are performed by the single processor 1001, but they may be performed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a ROM (Read Only Memory), an EPROM (Erasable Programmable ROM), an EEPROM (Electrically Erasable Programmable ROM), a RAM (Random Access Memory) or the like, for example. The memory 1002 may be referred to as a register, a cache, a main memory (main storage device) or the like. The memory 1002 can store programs (program codes), software modules or the like that can be executed to implement the radio communication method according to one embodiment of the present invention.

The storage 1003 is a computer-readable storage medium and may be arranged with at least one of an optical disk such as a CD-ROM (Compact Disc ROM), a hard disk drive, a flexible disk, a magnetic optical disk (for example, a compact disk, a digital versatile disk, a Blu-ray (registered trademark) disk), a smart card, a flash memory (for example, a card, a stick, a key drivel, a floppy (registered trademark), a magnetic strip or the like. The storage 1003 may be referred to as an auxiliary storage device. The above-stated storage medium may be a database or a server including the memory 1002 and/or the storage 1003 or any other appropriate medium.

The communication device 1004 is a hardware item (transceiver device) for communication over computers via a wired and/or wireless network and may be also referred to as a network device, a network controller, a network card, a communication module or the like. For example, the above-stated components may be implemented in the communication device 1004.

The input device 1005 is an input device for receiving external inputs (for example, a keyboard, a mouse, a microphone, a switch, a button, a sensor or the like). The output device 1006 is an output device for providing external outputs (for example, a display, a speaker, a LED ramp or the like). Note that the input device 1005 and the output device 1006 may be integrally arranged (for example, a touch panel).

Also, the respective devices such as the processor 1001 and the memory 1002 are connected with each other via the bus 1007 for communicating information. The bus 1007 may be arranged with a single bus or different buses for different devices.

Also, the user equipment 100 and the base station 200 may be arranged to include a hardware item such as a macro processor, a digital signal processor (DSP), an ASIC (Application Specific Integrated Circuit), a PLD (Programmable Logic Device), a FPGA (Field Programmable Gate Array) or the like, and a part or all of the functional blocks may be implemented in the hardware Item. For example, the processor 1001 may be implemented with at least one of these hardware items.

Transmission of information is not limited to the embodiments/implementations as described in the present specification and may be made in any other manner. For example, information may be transmitted in physical layer signaling (for example, DCI (Downlink Control Information) and UCI (Uplink Control Information)), upper layer signaling (for example, RRC (radio Resource Control) signaling, MAC (medium Access Control) signaling, broadcast information (MIB (master Information Block) and SIB (System Information Block)) or any other signal or combinations thereof. Also, the RRC signaling may be referred to as an RRC message and may be an BBC Connection Setup message, an RRC Connection Reconfiguration message or the like.

The respective embodiments/implementations as described in the present specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations as described in the present specification may be permutable, as long as there is not inconsistency. For example, for methods as described in the present specification, various steps are presented in an exemplary order, and the present invention is not limited to the presented certain order.

Certain operations performed by the base station 200 as described in the present specification may be performed by its upper node in some cases. In a network including one or mere network nodes having base stations, various operations performed to communicate with terminals may be apparently performed by the base stations and/or network nodes other than the base stations (for example, a MME or an S-SW can be assumed, hut the network nodes are not limited to them). Although it has been described that the single network node other than the base stations is used in the above example, combinations of multiple other network nodes (for example, an MME and an S-GW) may be used.

Information and others may be output from an upper layer (or a lower layer) to a lower layer (or an upper layer). They may be input and output via multiple network nodes.

Incoming and outgoing information and others may be stored in a certain location (for example, a memory) and/or managed in a management table. The incoming and outgoing information and others may be overwritten, updated or added. The outgoing information and others may be deleted. The incoming information and others may be transmitted to other device.

Determination may be made with a one-bit value (0 or 1), a Boolean value (true or false) or numerical comparison (for example, comparison with a predetermined value).

The embodiments/implementations as described in the present specification may be used singularly or in combinations or switched in connection with execution. Also, indication of predetermined information (for example, indication "it is X") is not limited to explicit manners and may be performed implicitly (for example, the predetermined information is not indicated).

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any restriction to the present invention.

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Also, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terminologies described in the present specification and/or terminologies required to understand the present specification may be replaced with terminologies having the same or similar meanings. For example, a channel and/or a symbol may be a signal. Also, the signal may be a message. Also, a component carrier (CC) may be referred to as a carrier frequency, a cell or the like.

The terminologies "system" and "network" for use in the present specification are interchangeably used.

Also, information, a parameter and so on as described in the present specification may be represented with an absolute value, a relative value from a predetermined value or other corresponding information. For example, a radio resource may be specified with an index.

Names as used for the above-stated parameters ace not restrictive from any standpoint. Furthermore, there are some cases where formulae and so on using these parameters may be different from ones as explicitly disclosed in the present specification. Various channels (for example, a PUCCH, a PDCCH or the like) and information elements (for example, a TPC or the like) can be identified with any preferred names, and the various names assigned to these various channels and information elements are not restrictive from any standpoint.

A base station can accommodate one or more (for example, three) cells (also referred to as sectors). If the base station accommodates multiple cells, the whole coverage area of the base station can be segmented into multiple smaller areas, and the respective smaller areas can provide communication services with a base station subsystem (for example, indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terminologies "determining" as used in the present specification may include various operations. The "determining" may Include calculating, computing, processing, deriving, investigating, looking up (for example, looking up a table, a database or other data structures) and ascertaining, for example. Also, the "determining" may include receiving (for example, receiving information), transmitting (for example, transmitting information), inputting, outputting and accessing (for example, accessing data in a memory). Also, the "determining" may include resolving, selecting, choosing, establishing, comparing or the like. In other words, the "determining" may include any operation.

The terminologies "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (both visible and invisible) domain.

A reference signal can be omitted as a RS (Reference Signal) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The terminology "means" in an arrangement of each apparatus as stated above may be replaced with "unit", "circuit", "device" or the like.

As long as the terminologies "including", "comprising" and variations thereof are used in the present specification or claims, these terminologies are intended to be inclusive similar to the terminology "comprising". Furthermore, the terminology "or" as used in the present specification or claims is intended not to be an exclusive OR.

A radio frame may be arranged with one ox more frames in a time domain. In the time domain, one or more frames each may be referred to as a subframe. The subframe may be further arranged with one or more slots in the time domain. The slot may be further arranged with one or more symbols (OFDM symbols, SC-FDMA symbols and so on) In the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (frequency bandwidths, transmission power and so on available in the mobile station) to mobile stations. The minimum time unit for scheduling may be referred to as a TTI (Transmission Time Interval). For example, one subframe, multiple contiguous subframes or one slot may be referred to as the TTI. A resource block (RB) may be a resource assignment unit in the time domain and the frequency domain and may include one or more contiguous subcarriers in the frequency domain. Also, in the time domain, the resource block may include one or more symbols and have one slot, one subframe or one TTI in length. The single TTI and subframe each may be arranged with one or more resource blocks. The above-stated arrangement of radio frame is merely exemplary, and the number of subframes in the radio frame, the number of slots in the subframe, the number of symbols and resource blocks in the slot and the number of subcarriers in the resource block can be changed in any manner.

Although the embodiments of the present invention have been described in detail, the present invention is not limited to the above-stated specific embodiments, end various modifications and variations can be made within the spirit of the present invention as recited in claims.

The present application is based on and claims the benefit of priority of Japanese Priority Application No. 2016-073457 filed on Mar. 31, 2016, the entire contents of which are hereby incorporated by reference.

EXPLANATIONS OF LETTERS OR NUMERALS

10: Radio communication system
100: User equipment
110: Transmission and reception unit
120: Buffer status report transmission unit
200: Base station

The invention claimed is:

1. A user equipment, comprising:
a transceiver that transmits and receives radio signals to and from a base station,
wherein the transceiver transmits, to the base station, a speculative buffer status report indicating a buffer status that is expected in a subsequent subframe,
wherein prohibition of transmission of the speculative buffer status report based on data size shown in the speculative buffer status report is set for each user equipment or each logical channel, and
wherein, in a case where the data size shown in the speculative buffer status report exceeds a given data size, the speculative buffer status report is not transmitted.

2. The user equipment according to claim 1, wherein the subsequent subframe is a subframe after a predetermined number of subframes from a current subframe in which the speculative buffer status report is transmitted, or a subframe after a number of subframes indicated in the speculative buffer status report.

3. The user equipment according to claim 2, wherein the transceiver transmits, to the base station, a new speculative buffer status report, which indicates a re-expected buffer status with respect to the subsequent subframe, so as to update the speculative buffer status report with respect to the subsequent subframe.

4. The user equipment according to claim 2, wherein the transceiver transmits, to the base station, the speculative buffer status report in response to downlink control signaling.

5. The user equipment according to claim 2, wherein the transceiver exclusively transmits the speculative buffer status report and a normal buffer status report indicating a current buffer status.

6. The user equipment according to claim 2, further comprising a memory that includes a plurality of buffer status report tables corresponding to buffer size levels different from each other.

7. The user equipment according to claim 1, wherein the transceiver transmits, to the base station, a new speculative buffer status report, which indicates a re-expected buffer status with respect to the subsequent subframe, so as to update the speculative buffer status report with respect to the subsequent subframe.

8. The user equipment according to claim 7, further comprising a processor that applies a process ID, which is the same as a process ID applied to the speculative buffer status report, to the new speculative buffer status report.

9. The user equipment according to claim 8, wherein the transceiver transmits, to the base station, the speculative buffer status report in response to downlink control signaling.

10. The user equipment according to claim 8, wherein the transceiver exclusively transmits the speculative buffer status report and a normal buffer status report indicating a current buffer status.

11. The user equipment according to claim 7, wherein the transceiver transmits, to the base station, the speculative buffer status report in response to downlink control signaling.

12. The user equipment according to claim 7, wherein the transceiver exclusively transmits the speculative buffer status report and a normal buffer status report indicating a current buffer status.

13. The user equipment according to claim 7, further comprising a memory that includes a plurality of buffer status report tables corresponding to buffer size levels different from each other.

14. The user equipment according to claim 1, wherein the transceiver transmits, to the base station, the speculative buffer status report in response to downlink control signaling.

15. The user equipment according to claim 1, wherein the transceiver exclusively transmits the speculative buffer status report and a normal buffer status report indicating a current buffer status.

16. The user equipment according to claim 1, further comprising a memory that includes a plurality of buffer status report tables corresponding to buffer size levels different from each other.

* * * * *